United States Patent
Koenig et al.

(10) Patent No.: US 9,458,262 B2
(45) Date of Patent: Oct. 4, 2016

(54) PROCESS FOR PREPARING ISOBUTENE HOMOPOLYMERS OR COPOLYMERS

(71) Applicants: Hannah Maria Koenig, Mannheim (DE); Rainer Urban, Ludwigshafen (DE); Klaus Muehlbach, Gruenstadt (DE); Thomas Wettling, Limburgerhof (DE); Uwe Rachwalsky, Ludwigshafen (DE); Stefan Hirsch, Neustadt (DE); Anne Berg, Sandhausen (DE); Helmut Mach, Heidelberg (DE)

(72) Inventors: Hannah Maria Koenig, Mannheim (DE); Rainer Urban, Ludwigshafen (DE); Klaus Muehlbach, Gruenstadt (DE); Thomas Wettling, Limburgerhof (DE); Uwe Rachwalsky, Ludwigshafen (DE); Stefan Hirsch, Neustadt (DE); Anne Berg, Sandhausen (DE); Helmut Mach, Heidelberg (DE)

(73) Assignee: BASF SE, Ludwigshafen (DE)

( * ) Notice: Subject to any disclaimer, the term of this patent is extended or adjusted under 35 U.S.C. 154(b) by 291 days.

(21) Appl. No.: 13/655,839

(22) Filed: Oct. 19, 2012

(65) Prior Publication Data

US 2013/0102748 A1    Apr. 25, 2013

Related U.S. Application Data

(60) Provisional application No. 61/549,765, filed on Oct. 21, 2011.

(51) Int. Cl.
- *C08F 10/10* (2006.01)
- *C08F 210/10* (2006.01)
- *C08F 110/10* (2006.01)

(52) U.S. Cl.
CPC ............. *C08F 10/10* (2013.01); *C08F 110/10* (2013.01); *C08F 210/10* (2013.01)

(58) Field of Classification Search
CPC ..... C08F 10/10; C08F 110/10; C08F 210/10
See application file for complete search history.

(56) References Cited

U.S. PATENT DOCUMENTS

| | | | |
|---|---|---|---|
| 3,808,187 A * | 4/1974 | Steigerwald et al. | ........ 526/208 |
| 2008/0293900 A1 | 11/2008 | Hanefeld et al. | |
| 2011/0201772 A1 | 8/2011 | König et al. | |
| 2012/0142868 A1 | 6/2012 | König et al. | |
| 2012/0165473 A1 | 6/2012 | Koenig et al. | |
| 2012/0208971 A1 | 8/2012 | König et al. | |
| 2013/0217847 A1 * | 8/2013 | Wettling | ............... C08F 110/10 526/206 |

FOREIGN PATENT DOCUMENTS

| | | | | |
|---|---|---|---|---|
| CA | 2863836 A1 * | 8/2013 | ............. | C08F 10/10 |
| DE | 2 061 289 | 6/1972 | | |
| DE | 100 28 585 A1 | 12/2001 | | |
| DE | 10 2005 055 818 | 5/2007 | | |
| WO | WO 2005/066222 A1 | 7/2005 | | |
| WO | WO 2011/101281 A1 | 8/2011 | | |

OTHER PUBLICATIONS

Clayden et al., "Organic Chemistry," Oxford University Press 2004, pp. 340-347.*
Topchiev, A. V. et al., "Boron Fluoride," 1959, Pergamon Press, pp. 66-68.*
International Search Report and Written Opinion issued Dec. 18, 2012 in PCT/EP2012/069995 with English translation of categories of cited documents.
U.S. Appl. No. 13/765,031, filed Feb. 12, 2013, Wettling, et al.
U.S. Appl. No. 13/735,385, filed Jan. 7, 2013, Wettling, et al.
U.S. Appl. No. 13/568,421, filed Aug. 7, 2012, Hannah Maria König, et al.
U.S. Appl. No. 14/436,951, filed Apr. 20, 2015, Hansch, et al.

* cited by examiner

*Primary Examiner* — Richard A Huhn
(74) *Attorney, Agent, or Firm* — Oblon, McClelland, Maier & Neustadt, L.L.P.

(57) ABSTRACT

Preparation of isobutene homopolymers or copolymers having a number average molecular weight of from 500 to 5 000 000 by polymerization of isobutene or an isobutene-comprising monomer mixture in the presence of a Lewis acid or a complex comprising a Lewis acid as polymerization catalyst, wherein the polymerization is carried out in the presence of at least one hemiacetal or full acetal which can be obtained by protic acid-catalyzed reaction of at least one $C_1$-$C_{12}$-hydrocarbyl alcohol with at least one aldehyde or ketone having from 1 to 12 carbon atoms.

6 Claims, No Drawings

PROCESS FOR PREPARING ISOBUTENE HOMOPOLYMERS OR COPOLYMERS

The present invention relates to an improved process for preparing isobutene homopolymers or copolymers having a number average molecular weight of from 500 to 5 000 000 by polymerization of isobutene or an isobutene-comprising monomer mixture in the presence of a Lewis acid or a complex comprising a Lewis acid as polymerization catalyst.

The present invention further relates to the use of particular hemiacetals or full acetals in the polymerization of isobutene or an isobutene-comprising monomer mixture for improving the product quality of isobutene homopolymers or copolymers having a number average molecular weight of from 500 to 5 000 000; in particular, a reduction in the tendency of the polymers obtained to discolor is achieved.

Isobutene or isobutene-comprising monomer mixtures are, as is known, polymerized with the aid of Lewis acids or complexes comprising Lewis acids as catalysts to form isobutene homopolymers or copolymers. As suitable Lewis acids, use is often made of Friedel-Crafts catalysts such as boron trifluoride or aluminum trichloride. The polymerization is usually carried out in the liquid phase with concomitant use of solvents or diluents. It is also possible to make concomitant use of compounds which influence the reaction rate and thus the molecular weight, for example accelerators and/or termination reagents.

However, the product quality of the isobutene homopolymers and copolymers obtained by the processes of the prior art is still in need of improvement. Thus, the molecular weight distribution of the polymers is usually too nonuniform and too broad. Furthermore, these polymers comprise too many impurities. In particular, they tend to discolor during work-up and/or storage after they have been produced, i.e. they become darker and often acquire a dirty yellowish to brownish color.

It was an object of the present invention to provide a process for preparing isobutene homopolymers or copolymers which no longer has the above-described disadvantages of the prior art.

We have accordingly found the process defined at the outset, in which the polymerization is carried out in the presence of at least one hemiacetal or full acetal which can be obtained by protic acid-catalyzed reaction of at least one $C_1$-$C_{12}$-hydrocarbyl alcohol with at least one aldehyde or ketone having from 1 to 6 carbon atoms.

The at least one hemiacetal or full acetal is preferably used in an amount of from 10 to 5000 ppm by weight, in particular from 25 to 2500 ppm by weight, especially from 50 to 1000 ppm by weight, in each case based on the isobutene used in the polymerization.

The hemiacetals used according to the invention can be obtained by reaction of equimolar amounts of hydrocarbyl alcohol and aldehyde or ketone. The full acetals used according to the invention can be obtained by reaction of one equivalent of hydrocarbyl alcohol with two equivalents of aldehyde or ketone. It is also possible to use mixtures of hemiacetals and full acetals. The corresponding hemiacetals and full acetals are generally in chemical equilibrium with one another.

To form hemiacetals and full acetals from hydrocarbyl alcohols and aldehydes or ketones, the presence of protic acids which makes the addition of the alcohol oxygen onto the carbonyl function to form the hemiacetal and in the second step the addition of the second alcohol molecule and the elimination of water to form the full acetal possible is necessary. Catalytic amounts of protic acids are usually sufficient. Typical protic aids here are inorganic acids such as hydrochloric acid or dilute sulfuric acid or organic acids such as carboxylic acids, for example acetic acid, trichloroacetic acid or trifluoroacetic acid, or sulfonic acids, for example methanesulfonic acid or toluenesulfonic acid.

DE-A 2 061 289 describes a process for the polymerization of isobutylene by means of Friedel-Crafts catalysts such as boron trifluoride, in which the reaction is carried out in the presence of a solution of formaldehyde in alcohols. This is said to make better regulation of the molecular weight of the polyisobutylene obtained possible. Since DE-A 2 061 289 does not mention the presence of protic acids, it can be assumed that no hemiacetals or full acetals are formed from the formaldehyde and the alcohols; a purely physical solution of formaldehyde in alcohols is present here.

For the purposes of the present invention, $C_1$-$C_{12}$-hydrocarbyl alcohols are organic compounds which have a total of up to 12 carbon atoms and bear one more, in particular one, two or three, hydroxyl groups bound to $sp^3$-hydridized carbon atoms. Apart from the hydroxyl groups, these organic compounds have predominantly hydrocarbon character but can to a smaller extent comprise heteroatoms such as nitrogen or oxygen or further functional groups which are inert toward aldehydes and ketones.

These $C_1$-$C_{12}$-hydrocarbyl alcohols preferably have only one hydroxyl group per molecule. Particularly suitable $C_1$-$C_{12}$-hydrocarbyl alcohols are linear or branched $C_1$-$C_{12}$-alkanols, especially linear or branched $C_1$-$C_6$-alkanols, $C_5$-$C_{12}$-cycloalkanols and $C_7$-$C_{12}$-aryl alkanols. Typical examples of such compounds are methanol, ethanol, n-propanol, isopropanol, n-butanol, isobutanol, sec-butanol, tert-butanol, n-pentanol, sec-pentanol, tert-pentanol, n-hexanol, n-heptanol, n-octanol, 2-ethylhexanol, n-nonanol, n-decanol, 2-propylheptanol, n-undecanol, n-dodecanol, cyclopentanol, cyclohexanol, 2-, 3- or 4-methylcyclohexanol, cycloheptanol, benzyl alcohol, 1- or 2-phenylethanol, 1-, 2- or 3-phenylpropanol, 1-, 2-, 3- or 4-phenylbutanol, (o-, m- or p-methylphenyl)methanol, 1,2-ethylene glycol, 1,3-propylene glycol, 1,2,3-propanetriol (glycerol), 1,2-ethylene glycol monomethyl ether, 1,2-ethylene glycol monoethyl ether, 1,3-propylene glycol monomethyl ether and 1,3-propylene glycol monoethyl ether. It is also possible to use mixtures of various $C_1$-$C_{12}$-hydrocarbyl alcohols of this type.

Particular preference is given to using branched and in particular linear $C_1$-$C_{12}$-alkanols, especially branched and in particular linear $C_1$-$C_6$-alkanols, as $C_1$-$C_{12}$-hydrocarbyl alcohols.

Aldehydes and ketones having from 1 to 12 carbon atoms can be aliphatic, cycloaliphatic or aromatic in nature. They generally comprise, apart from the aldehyde or ketone function, a pure hydrocarbon framework and thus have predominantly hydrocarbon character. However, they can also comprise, to a small extent, heteroatoms such as nitrogen or oxygen or further functional groups which are inert toward hydroxyl groups.

Typical examples of such aldehydes and ketones are formaldehyde, acetaldehyde, propionaldehyde, butyraldehyde, n-pentanal, n-hexanal, n-octanal, n-decanal, n-dodecanal, cyclopentyl carbaldehyde, cyclohexyl carbaldehylde, benzaldehyde, phenylacetaldehyde, 2- or 3-phenylpropionaldehyde, 2-, 3- or 4-phenylbutyraldehyde, acetone, butanone, 2- or 3-pentanone, cyclopentanone, cyclohexanone and acetophenone. It is also possible to use mixtures of various aldehydes of this type or various ketones of this type.

As aldehydes and ketones having from 1 to 12 carbon atoms, particular preference is given to using aldehydes and ketones having from 1 to 4 carbon atoms, especially aldehydes having from 1 to 4 carbon atoms. Very particular preference is given to formaldehyde which can be used in monomeric form, for example in the form of its concentrated aqueous solution, or else as trioxane or as paraformaldehyde for the protic acid-catalyzed reaction with at least one $C_1$-$C_{12}$-hydrocarbyl alcohol to form the hemiacetals or full acetals.

In a preferred embodiment of the present invention, the polymerization of isobutene or an isobutene-comprising monomer mixture is carried out in the presence of at least one hemiacetal or full acetal which can be obtained by protic acid-catalyzed reaction of at least one linear $C_1$-$C_6$-alkanol with at least one aldehyde having from 1 to 4 carbon atoms, in particular with formaldehyde.

The structure of such hemiacetals and full acetals is shown by the following general formula (I):

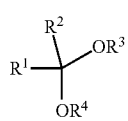

(I)

where
the variables $R^1$ and $R^2$ are, independently of one another, hydrogen, $C_1$-$C_{12}$-alkyl radicals, $C_5$-$C_{12}$-cycloalkyl radicals or $C_7$-$C_{12}$-arylalkyl radicals, where the two variables $R^1$ and $R^2$ can also form a ring and the sum of the carbon atoms in the two variables $R^1$ and $R^2$ has to be from 1 to 12,
the variable $R^3$ is hydrogen or a $C_1$-$C_{12}$-alkyl radical, a $C_5$-$C_{12}$-cycloalkyl radical or a $C_7$-$C_{12}$-arylalkyl radical and
the variable $R^4$ is a $C_1$-$C_{12}$-alkyl radical, a $C_5$-$C_{12}$-cycloalkyl radical or a $C_7$-$C_{12}$-arylalkyl radical.

Typical individual examples of such hemiacetals and full acetals are the hemiacetal of methanol and formaldehyde, the full acetal of methanol and formaldehyde, the hemiacetal of ethanol and formaldehyde, the full acetal of ethanol and formaldehyde the hemiacetal of n-propanol and formaldehyde, the full acetal of n-propanol and formaldehyde, the hemiacetal of n-butanol and formaldehyde, the full acetal of n-butanol and formaldehyde, the hemiacetal of methanol and acetaldehyde, the full acetal of methanol and acetaldehyde, the hemiacetal of ethanol and acetaldehyde, the full acetal of ethanol and acetaldehyde, the hemiacetal of n-propanol and acetaldehyde, the full acetal of n-propanol and acetaldehyde, the hemiacetal of n-butanol and acetaldehyde and the full acetal of n-butanol and acetaldehyde.

Heterogeneous or in particular homogeneous catalysts from the class of Lewis acids are used as polymerization catalysts. Lewis acids are compounds which are electron-deficient at their central atom and derive their catalytic activity therefrom. In particular, these Lewis acids are compounds of elements of main group 3 of the Periodic Table, i.e. of boron, aluminum, indium, gallium and thallium. However, halides, in particular chlorides, of tin, of titanium, of antimony or of iron, for example iron (III) chloride, can also be used. Such Lewis acids are often also referred to as Friedel-Crafts catalysts.

Particular preference is given to boron and aluminum compounds, in particular boron halides and aluminum halides, for example anhydrous aluminum chloride, boron trichloride, boron trifluoride, boron tribromide, boron triiodide and in particular boron trihalide complexes with activators, for example boron trifluoride etherates, e.g. boron trifluoride diethyl etherate, or boron trifluoride-alcohol complexes, as polymerization catalysts. If boron halides, in particular boron trifluoride, are used, the use of additional activators in the complexes mentioned is advisable. A particularly preferred activator for boron trifluoride here is an alcohol, in particular a $C_1$-$C_4$-alcohol, e.g. methanol, ethanol, isopropanol, isobutanol or sec-butanol.

The amount of polymerization catalyst to be used depends essentially on the type of catalyst and on the reaction conditions, in particular the reaction temperature, and the desired molecular weight of the polymer. It can be determined for the individual reaction system by means of a few simple tests. In general, the polymerization catalyst, i.e. the Lewis acid or the complex comprising a Lewis acid, is used in amounts of from 0.0001 to 1% by weight, in particular from 0.0005 to 0.1% by weight, especially from 0.001 to 0.01% by weight, in each case based on isobutene used.

In addition to the Lewis acid or the complex comprising the Lewis acid as polymerization catalyst, the polymerization medium can also comprise compounds such as accelerators and/or termination reagents which influence the reaction rate and thus the molecular weight of the polymers to be formed. According to the teaching of DE-A 2 061 289, alcohols, phenols, mineral acids and carboxylic acids are used as accelerators of this type and are intended not only to accelerate the course of the reaction and give higher molecular weights but also reduce the amount of catalyst. Termination reagents, which suppress propagation of polymer chain growth, known from DE-A 2 061 289 and WO 2005/066222 A1 are diisobutylene, mercaptans, sulfides, polysulfides, hydrogen cyanide, cyanides and nitriles.

For the purposes of the present invention, isobutene homopolymers are polymers which, based on the polymer, are made up of at least 98 mol %, preferably at least 99 mol %, of isobutene. Correspondingly, isobutene copolymers are polymers which comprise more than 2 mol % of monomers other than isobutene, for example linear butenes, in copolymerized form.

The isobutene homopolymers and copolymers prepared by the process of the invention preferably have a number average molecular weight $M_n$ (determined by gel permeation chromatography) of from 1000 to 2 500 000, in particular from 5000 to 1 250 000, especially from 10 000 to 750 000.

In general, the isobutene homopolymers and copolymers prepared by the process of the invention have a polydispersity (PDI=ratio of the weight average molecular weight to the number average molecular weight $M_w/M_n$) of from 1 to 20, in particular from 1 to 10, especially from 1 to 5.

As isobutene source for use of isobutene or an isobutene-comprising monomer mixture as monomer to be polymerized, it is possible to use either pure isobutene or isobutene-comprising $C_4$-hydrocarbon streams, for example $C_4$-affinates, in particular "raffinate 1", $C_4$ fractions from isobutane dehydrogenation, $C_4$ fractions from steam crackers and from FCC (fluid catalytic cracking), as long as they have largely been freed of 1,3-butadiene present therein. A $C_4$-hydrocarbon stream from an FCC refinery unit is also known as "b/b" stream. Further suitable isobutene-comprising $C_4$-hydrocarbon streams are, for example, the product stream from a propylene-isobutane cooxidation or the product stream from a metathesis unit, which is generally used after conventional purification and/or concentration. Suitable $C_4$-hdyrocarbon streams generally comprise less than 500 ppm, preferably less than 200 ppm, of butadiene. The presence of 1-butene and of cis- and trans-2-butene is largely noncritical. The isobutene concentration in the $C_4$-hydrocarbon streams mentioned is typically in the range from 40 to 60% by weight. Thus, raffinate 1 generally consists essentially of from 30 to 50% by weight of isobutene, from 10 to 50% by weight of 1-butene, from 10 to 40% by weight of cis- and trans-2-butene and from 2 to 35% by weight of butanes; in the polymerization process of the invention, the unbranched butenes in the raffinate 1 are generally virtually inert and only the isobutene is polymerized.

In an embodiment, an industrial $C_4$-hydrocarbon stream having an isobutene content of from 1 to 100% by weight, in particular from 1 to 99% by weight, especially from 1 to 90% by weight, particularly preferably from 30 to 60% by weight, in particular a raffinate 1 stream, a b/b stream from an FCC refinery unit, a product stream from a propylene-isobutane cooxidation or a product stream from a metathesis unit, is used as a monomer source for the polymerization.

The isobutene-comprising monomer mixture mentioned can comprise small amounts of contaminants such as water, carboxylic acids or mineral acids without critical decreases in yield or selectivity occurring. It is advantageous to avoid accumulation of these impurities by removing such harmful substances from the isobutene-comprising monomer mixture, for example by adsorption on solid adsorbents such as activated carbon, molecular sieves or ion exchangers.

It is also possible to react monomer mixtures of isobutene or the isobutene-comprising hydrocarbon mixture with olefinically unsaturated monomers which can be copolymerized with isobutene. If monomer mixtures of isobutene with suitable comonomers are to be copolymerized, the monomer mixture preferably comprises at least 5% by weight, particularly preferably at least 10% by weight and in particular at least 20% by weight, of isobutene and preferably not more than 95% by weight, particularly preferably not more than 90% by weight and in particular not more than 80% by weight, of comonomers.

Possible copolymerizable monomers are: vinylaromatics such as styrene and α-methylstyrene, $C_1$-$C_4$-alkylstyrenes such as 2-, 3- and 4-methylstyrene and 4-tert-butylstyrene, halostyrenes such as 2-, 3- or 4-chlorostyrene and also isoolefins having from 5 to 10 carbon atoms, e.g. 2-methyl-1-butene, 2-methyl-1-pentene, 2-methyl-1-hexene, 2-ethyl-1-pentene, 2-ethyl-1-hexene and 2-propyl-1-heptene. Further possible comonomers are olefins having a silyl group, e.g. 1-trimethoxysilylethene, 1-(trimethoxysilyl)propene, 1-(trimethoxysilyl)-2-methyl-2-propene, 1-[tri(methoxyethoxy)silyl]ethene, 1-[tri(methoxyethoxy)silyl]propene and 1-[tri(methoxyethoxy)silyl]-2-methyl-2-propene. Further possible comonomers are, depending on the polymerization conditions, 1-butene and cis- and trans-2-butene.

If copolymers are to be prepared by the process of the invention, the process can be configured so that random polymers or preferably block copolymers are preferentially formed. To prepare block copolymers, it is possible, for example, to supply the various monomers successively to the polymerization reaction, with the addition of the second comonomer commencing, in particular, only when the first comonomer has been at least partially polymerized. In this way, it is possible to obtain diblock, triblock or higher block copolymers which have, depending on the order of addition of the monomers, a block of one or other comonomer as terminal block. However, block copolymers are in some cases also formed when all comonomers are introduced simultaneously into the polymerization reaction but one of them polymerizes significantly faster than the other(s). This is the case, in particular, when isobutene and a vinylaromatic compound, in particular styrene, are copolymerized in the process of the invention. Block copolymers having a terminal polystyrene block are then preferentially formed. This can be attributed to the vinylaromatic compound, especially styrene, polymerizing significantly more slowly than isobutene.

The polymerization can be carried out either continuously or batchwise. Continuous processes can be carried out by a method analogous to known processes of the prior art for the continuous polymerization of isobutene in the presence of boron trifluoride-based catalysts in the liquid phase. Suitable types of reactor for the polymerization process of the present invention are usually stirred vessel reactors, loop reactors and tube reactors and also fluidized-bed reactors, fluidized layer reactors, stirred tank reactors with and without solvents, liquid-bed reactors, continuous fixed-bed reactors and discontinuous fixed-bed reactors (batch operation).

The process of the invention can be carried out both at low temperatures, e.g. from $-90°$ C. to $0°$ C., and at higher temperatures, i.e. at at least $0°$ C., e.g. from $0°$ C. to $+30°$ C. or from $0°$ C. to $+50°$ C. However, the polymerization according to the process of the invention is preferably carried out at relatively low temperatures, generally from $-70°$ C. to $-10°$ C., in particular from $-60°$ C. to $-15°$ C.

If the polymerization according to the process of the invention is carried out at or above the boiling point of the monomer or monomer mixture to be polymerized, it is preferably carried out in pressure vessels, for example in autoclaves or in pressure reactors.

The polymerization according to the process of the invention is preferably carried out in the presence of an inert diluent. The inert diluent used should be suitable for reducing the increase in the viscosity of the reaction solution which generally occurs during the polymerization reaction to such an extent that removal of the heat of reaction evolved can be ensured. Suitable diluents are solvents or solvent mixtures which are inert toward the reagents used. Suitable diluents are, for example, aliphatic hydrocarbons such as n-butane, n-pentane, n-hexane, n-heptane, n-octane and isooctane, cycloaliphatic hydrocarbons such as cyclopentane and cyclohexane, aromatic hydrocarbons such as benzene, toluene and the xylenes and halogenated hydrocarbons, in particular halogenated aliphatic hydrocarbons such as methyl chloride, dichloromethane, trichloromethane (chloroform), 1,1-dichloroethane, 1,2-dichloroethane, trichloroethane and 1-chlorobutane, and also halogenated aromatic hydrocarbons and alkylaromatics which are halogenated in the alkyl side chains, e.g. chlorobenzene, monofluoromethylbenzene, difluoromethylbenzene and trifluoromethylbenzene, and also mixtures of the abovementioned diluents. The inert components of isobutene-comprising $C_4$-hydrocarbon streams also serve as diluents or as constituents of the abovementioned solvent mixtures.

The polymerization according to the invention is preferably carried out in a halogenated hydrocarbon, in particular in a halogenated aliphatic hydrocarbon, or in a mixture of halogenated hydrocarbons, in particular of halogenated aliphatic hydrocarbons, or in a mixture of at least one halogenated hydrocarbon, in particular a halogenated aliphatic hydrocarbon, and at least one aliphatic, cycloaliphatic or aromatic hydrocarbon, as inert diluent, for example a mixture of dichloromethane and n-hexane, usually in a volume ratio of from 10:90 to 90:10, in particular from 50:50 to 85:15. The diluents are preferably freed of impurities such as water, carboxylic acids or mineral acids, for example by adsorption on solid adsorbents such as activated carbon, molecular sieves or ion exchangers, before use.

In a further preferred embodiment, the polymerization according to the invention is carried out in halogen-free aliphatic hydrocarbons or in particular halogen-free aromatic hydrocarbons, in particular toluene.

The polymerization according to the process of the invention is preferably carried out under largely aprotic reaction conditions, in particular under largely water-free reaction conditions. For the purposes of the present invention, largely aprotic or largely water-free reaction conditions means that the water content (or the content of protic impurities) in the reaction mixture is less than 50 ppm and in particular less than 5 ppm. In general, the starting materials are therefore dried by physical and/or chemical measures before use. In particular, it has been found to be useful for the aliphatic or cycloaliphatic hydrocarbons used as solvent to be, after conventional purification and predrying, admixed with an organometallic compound, for example an organolithium, organomagnesium or organoaluminum compound, in an amount which is sufficient to substantially remove the traces of water from the solvent. The solvent which has been treated in this way is then preferably condensed directly into the reaction vessel. The monomers to be polymerized, in particular isobutene or the isobutene-comprising mixtures, can also be treated in a similar way. Drying by means of other conventional desiccants such as molecular sieves or predried oxides such as aluminum oxide, silicon dioxide, calcium oxide or barium oxide, is also suitable. The halogenated solvents for which drying by means of metals such as sodium or potassium or by means of metal alkyls is not possible are freed of water or traces of water by means of desiccants suitable for this purpose, for example calcium chloride, phosphorus pentoxide or molecular sieves. Those starting materials for which treatment with metal alkyls is likewise not possible, for example vinylaromatic compounds, can also be dried in an analogous way.

To terminate the reaction ("quenching"), the reaction mixture is preferably deactivated, for example by addition of a protic compound, in particular by addition of water, alcohols such as methanol, ethanol, n-propanol and isopropanol or mixtures thereof with water, or by addition of an aqueous base, e.g. an aqueous solution of an alkali metal or alkaline earth metal hydroxide such as sodium hydroxide, potassium hydroxide, magnesium hydroxide or calcium hydroxide, an alkali metal or alkaline earth metal carbonate such as sodium, potassium, magnesium or calcium carbonate or an alkali metal or alkaline earth metal hydrogencarbonate such as sodium, potassium, magnesium or calcium hydrogencarbonate.

When the number average molecular weights of the isobutene homopolymers and copolymers to be achieved by means of the process of the invention are in the lower range, i.e. up to an $M_n$ of about 10 000, highly reactive isobutene homopolymers and copolymers having a content of terminal vinylidene double bonds (α-double bonds) per polyisobutene chain end of at least 50 mol %, preferably at least 60 mol %, preferably at least 70 mol %, preferably at least 80 mol %, preferably at least 85 mol %, particularly preferably at least 90 mol % and in particular at least 95 mol %, e.g. virtually 100 mol %, can be obtained. In particular, it also serves for the preparation of highly reactive isobutene copolymers which are made up of isobutene and at least one vinylaromatic monomer, in particular styrene, and have a content of terminal vinylidene double bonds (α-double bonds) per polyisobutene chain end of at least 50 mol %, preferably at least 60 mol %, preferably at least 70 mol %, preferably at least 80 mol %, preferably at least 80 mol %, preferably at least 85 mol %, particularly preferably at least 90 mol % and in particular at least 95 mol %, e.g. virtually 100 mol %. To prepare such copolymers of isobutene and at least one vinylaromatic monomer, in particular styrene, isobutene or an isobutene-comprising hydrocarbon fraction is copolymerized with the at least one vinylaromatic monomer in a weight ratio of isobutene to vinylaromatic of from 5:95 to 95:5, in particular from 30:70 to 70:30.

The highly reactive isobutene homopolymers or copolymers and especially the isobutene homopolymers prepared by the process of the invention preferably have a polydispersity ($PDI=M_w/M_n$) of from 1.05 to 5, preferably from 1.05 to 3 and in particular from 1.1 to 2.

The highly reactive isobutene homopolymers or copolymers prepared by the process of the invention preferably have a number average molecular weight $M_n$ (determined by gel permeation chromatography) of preferably from 500 to 10 000, in particular from 700 to 5000 and especially from 900 to 2500.

The present invention also provides for the use of hemiacetals or full acetals which can be obtained by protic-acid catalyzed reaction of at least one $C_1$-$C_{12}$-hydrocarbyl alcohol with at least one aldehyde or ketone having from 1 to 6 carbon atoms in the polymerization of isobutene or an isobutene-comprising monomer mixture in the presence of a Lewis acid or a complex comprising a Lewis acid as polymerization catalyst in order to improve the product quality of the resulting isobutene homopolymers or copolymers having a number average molecular weight of from 500 to 5 000 000.

In a preferred embodiment, these hemiacetals or full acetals are used for reducing the tendency of the isobutene homopolymers or copolymers obtained to discolor.

The process of the invention makes it possible to prepare low, medium and high molecular weight isobutene homopolymers and copolymers having a more uniform and narrower molecular weight distribution in high yields and purities. These polymers contain fewer impurities. In particular, they no longer tend to discolor to such a great extent during work-up and/or storage after they have been produced.

The invention claimed is:

1. A process for preparing an isobutene homopolymer or copolymer, the process comprising:
reacting at least one $C_1$-$C_{12}$-hydrocarbyl alcohol with at least one aldehyde or ketone comprising from 1 to 12 carbon atoms in a protic acid-catalyzed reaction to obtain at least one full acetal,
drying the at least one full acetal to obtain at least one dried full acetal, and
polymerizing a reaction mixture comprising isobutene or an isobutene-comprising monomer mixture, a Lewis acid or a complex comprising the Lewis acid as a polymerization catalyst, and the at least one dried full acetal to obtain the isobutene homopolymer or copolymer,
wherein
the isobutene homopolymer or copolymer has a number average molecular weight of from 500 to 5 000 000.

2. The process according to claim 1, wherein the at least one full acetal is obtained by a protic acid-catalyzed reaction of at least one linear $C_1$-$C_6$-alkanol with at least one aldehyde comprising from 1 to 4 carbon atoms.

3. The process according to claim 1, wherein the at least one dried full acetal is used in an amount of from 10 to 5000 ppm by weight, based on the isobutene used in said polymerizing.

4. The process according to claim 3, wherein the at least one full acetal is obtained by a protic acid-catalyzed reaction of at least one linear $C_1$-$C_6$-alkanol with at least one aldehyde comprising from 1 to 4 carbon atoms.

5. The process according to claim 1, wherein the isobutene homopolymer or copolymer has a reduced tendency of discoloration relative to an isobutene homopolymer or copolymer obtained in a polymerization in the absence of the at least one dried full acetal.

6. The process according to claim 1, wherein a water content in the reaction mixture is less than 50 ppm.

* * * * *